United States Patent

Kosaka et al.

[11] Patent Number: 5,911,892
[45] Date of Patent: Jun. 15, 1999

[54] JOG OPERATION METHOD FOR ROBOT

[75] Inventors: Tetsuya Kosaka; Hiromitsu Takahashi, both of Oshino-mura, Japan

[73] Assignee: Fauc Ltd., Yamanashi, Japan

[21] Appl. No.: 08/817,020

[22] PCT Filed: Aug. 8, 1996

[86] PCT No.: PCT/JP96/02255

§ 371 Date: May 21, 1997

§ 102(e) Date: May 21, 1997

[87] PCT Pub. No.: WO97/06473

PCT Pub. Date: Feb. 20, 1997

[30] Foreign Application Priority Data

Aug. 9, 1995 [JP] Japan .................................. 7-222811

[51] Int. Cl.$^6$ ............................................... B23K 9/12
[52] U.S. Cl. ............................... 219/125.1; 364/474.36; 901/42
[58] Field of Search ................... 219/125.1; 318/568.13, 318/568.19; 395/86; 364/474.36, 167.01; 901/4, 42

[56] References Cited

U.S. PATENT DOCUMENTS

| | | | |
|---|---|---|---|
| 4,771,222 | 9/1988 | Nakashima et al. | 318/568.19 |
| 5,053,976 | 10/1991 | Nose et al. | 395/86 |
| 5,313,563 | 5/1994 | Hara | 395/86 |
| 5,327,057 | 7/1994 | Kishi et al. | 318/568.19 |
| 5,608,618 | 3/1997 | Kosaka et al. | |

FOREIGN PATENT DOCUMENTS

| | | |
|---|---|---|
| 0 188 623 | 7/1986 | European Pat. Off. |
| 0 216 930 | 4/1987 | European Pat. Off. |
| 59-135508 | 8/1984 | Japan. |
| 63-256281 | 10/1988 | Japan. |
| 3-26482 | 2/1991 | Japan. |
| 4-137108 | 5/1992 | Japan. |

*Primary Examiner*—Clifford C. Shaw

[57] ABSTRACT

A non-orthogonal three-axis coordinate system in which, when a tool center point is moved to a start point (A) of a path (A-B), the direction of the path (A-B) is represented by an X axis (XAB), an axis vertical to the X axis and vertical to the axis of a tool (Z axis of a tool coordinate system) is represented by a Y axis (YAB), and the axis of the tool is represented by a Z axis (Zt). When the set coordinate system is selected by a jog operation section, and a key for rotational movement around the X axis is selected, a work angle of the tool can be adjusted. When a key for rotational movement around the Y axis is selected, a travel angle of the tool can be adjusted.

8 Claims, 7 Drawing Sheets

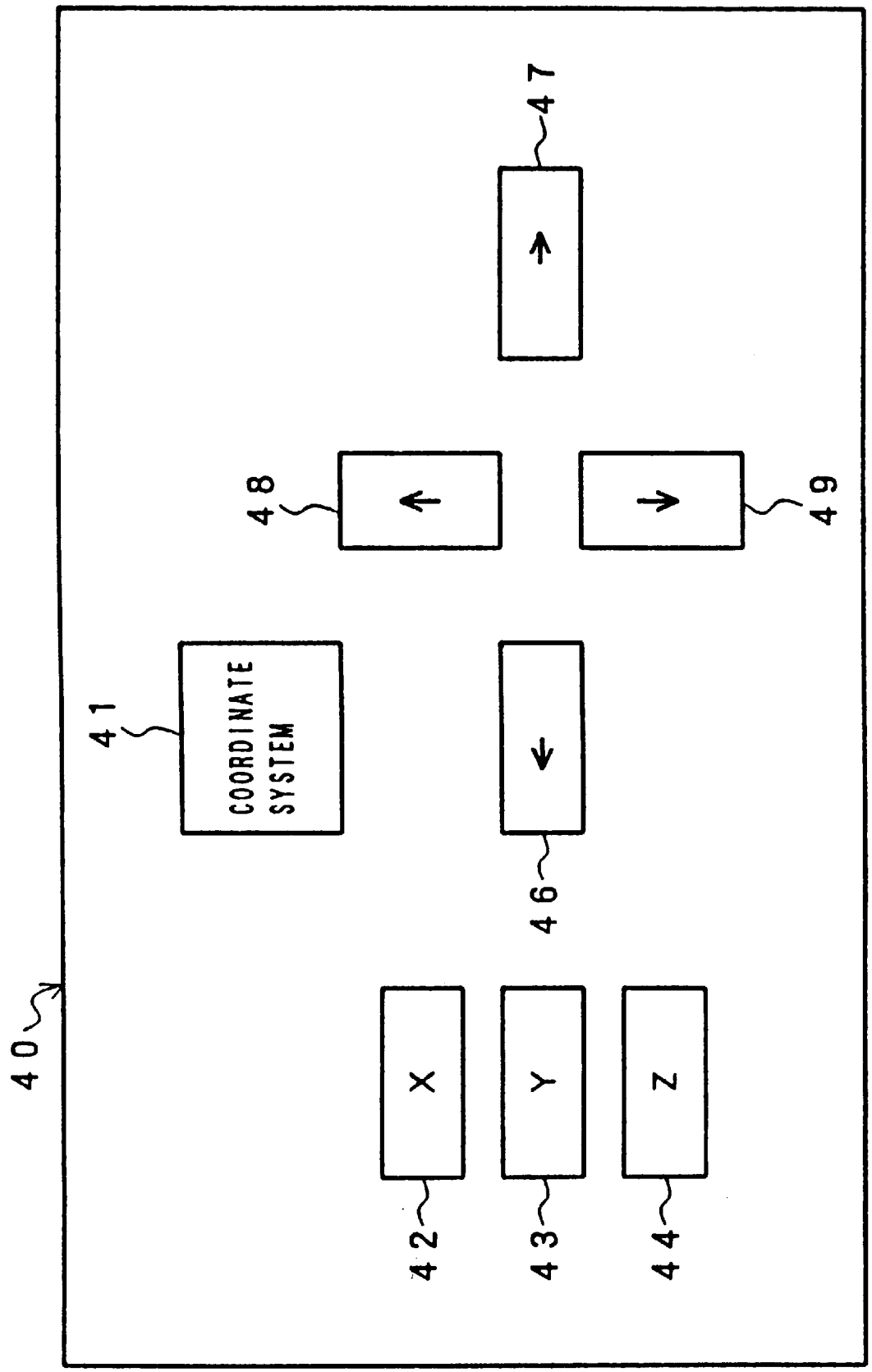

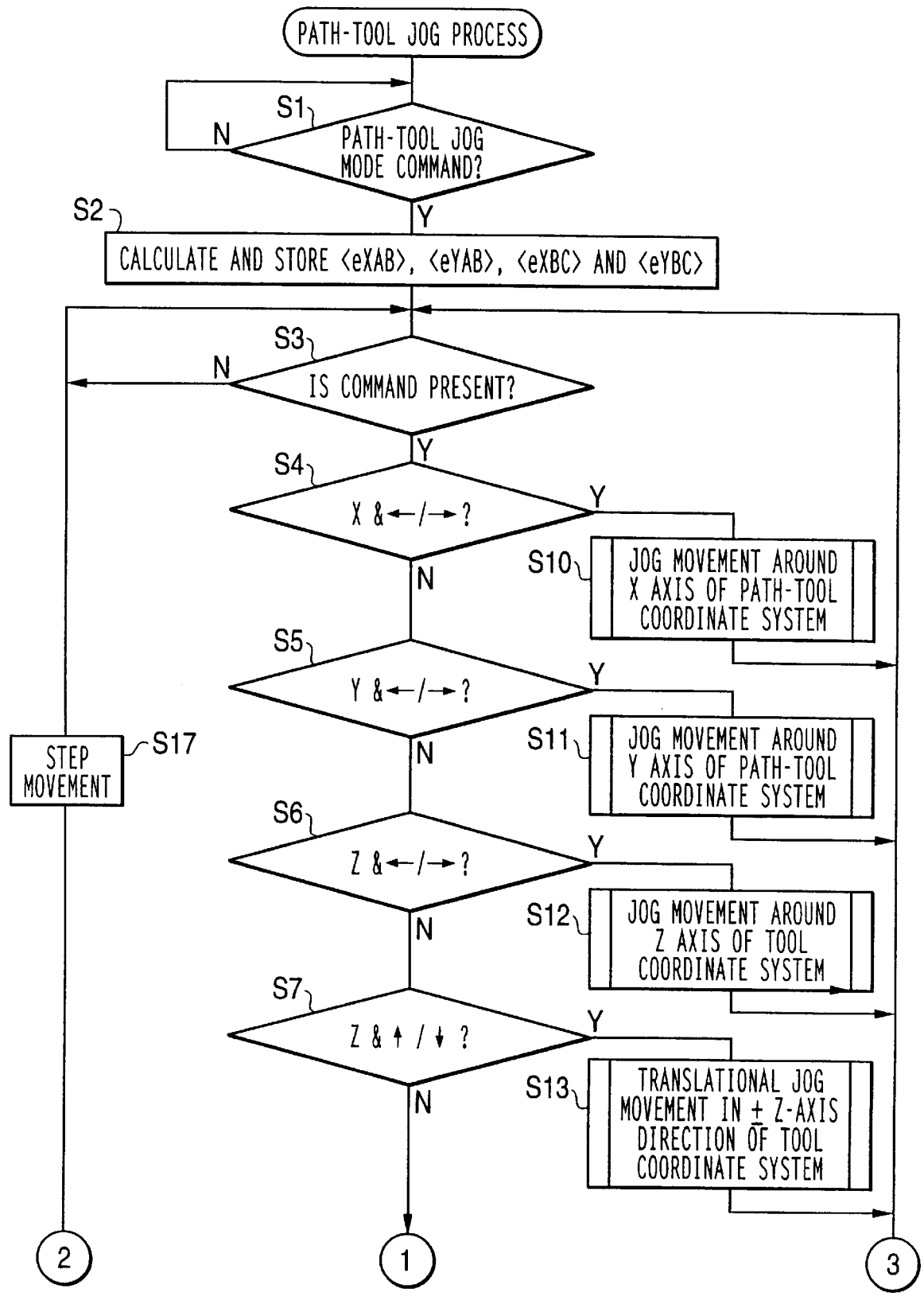

JOG OPERATION METHOD FOR ROBOT

TECHNICAL FIELD

The present invention relates to a jog operation method for an industrial robot (hereinafter referred to as a "robot") and, more particularly, to a jog operation method which is designed to perform a jog-feeding operation conforming to a coordinate system having coordinate axes which coincide with the moving directions of a robot. In particular, the present invention can be effectively applied when an attitude (attitude of a welding torch, a sealing gun, a spot gun, or the like) is to be taught to a welding robot or a sealing robot.

BACKGROUND ART

As typical methods of moving a robot toward a target position, a reproduction operation of an operation program and a jog operation are employed. The latter jog operation method comprises a base (world) coordinate system jog, a user coordinate system jog, a tool coordinate system jog, individual axes jog, and the like. These methods are selectively used for various applications.

Of these jogs, the tool coordinate system jog is characterized by that jog operation by translational/rotational moving direction during a jog operation can be specified according to a tool coordinate system defined together with a tool such as a welding torch, a sealing gun, a spot gun, or a hand which are to be mounted on the distal end of the robot. For this reason, this tool coordinate system jog is relatively frequently used in an application such as arc welding or sealing.

For example, in the case of an arc welding robot, as shown in FIG. 1, in many instances, a tool coordinate system such that a distal end 2 of a welding torch (hereinafter referred to as "torch") 1 is defined as an origin, a torch direction is defined as a Z axis, and a direction which frequently corresponds to a torch front is defined as an X axis. It should be noted that the "torch front" means a torch surface, which faces a welding line direction (advancing direction of welding) 3.

When teaching a robot its position for a jog operation conforming to the tool coordinate system defined as described above, at least at the stage of attitude teaching, in general, it is a common practice for an operator to adjust the attitude of the robot after bringing the robot to the position at which the direction of its X-axis coincides with the welding line direction 3. This is because, when one specific coordinate axis (X axis) of the tool coordinate system is made to coincide with the welding line direction 3, operability of the tool aided by the sense of the operator in the subsequent jog operation according to the coordinate system can be improved.

More specifically, the relationship between a jog operation key and the moving direction of the robot (especially, the direction of rotational movement) can be sensed with greater ease in this way. For example, an operator not only can be conscious of a jog key operation for moving around an ±X axis in correspondence with rotational movement around the welding line direction 3, but also can be conscious of rotational movement around an axis which is vertical to the welding line direction 3, or vertical to the coordinate axis corresponding to the axial direction of the tool, relating to a jog key operation for moving around a ±Y axis. As quantities for describing torch attitudes to be adjusted as described above, a work angle and a travel angle are used.

FIG. 2 is a view for explaining a work angle and a travel angle on an arc welding robot, and shows the relationship among a welding line, a reference surface, a work angle, a travel angle with reference to linear welding paths A and B. Referring to FIG. 2, a reference surface $\Gamma 0$ is used as a reference together with the welding line direction (direction of A - B) 3 when the work angle Is defined. In general, a work surface representing a work portion in which the welding path A-B is present is selected as the reference surface $\Gamma 0$. Reference symbol <n> denotes a normal vector representing the direction of the reference surface $\Gamma 0$, and reference symbol $\Gamma 1$ denotes a surface which is vertical to the reference surface $\Gamma 0$ with respect to the path A-B being a cross line. In this case, it must be noticed that the reference surface $\Gamma 0$ is used only to define the work angle.

When a plane $\gamma$ on which a straight line representing the direction (Z-axis direction of the tool coordinate system) of a torch 1 and the welding line A-B are placed is considered, an angle between the plane $\gamma$ and the reference plane $\Gamma 0$ is a work angle $\theta$. Also, when a vertical line g extending from a tool center point 2, and vertical to the welding line A-B, is set on the plane $\gamma$, an angle between a straight line representing the direction (Z-axis direction of the tool coordinate system) of the torch 1 and the straight line g is a travel angle $\Phi$. Thus, the work angle $\theta$ is an angle around the welding line A-B, while the travel angle $\Phi$ is an angle around the vertical line g extending from the welding line A-B on a reference plane (work surface) $\Gamma 0$.

For example, in fillet welding, an attitude having, as the work angles $\theta$, an angle which divides two work surfaces is taught. However, if the torch 1 (or its welding wire portion) is brought close to the work surface, a phenomenon such as undercut, overlap, or the like may be caused due to uneven heat transmission. Furthermore, when the travel angle $\Phi$ is excessively increased to smooth a bead shape, a so-called lack of penetration phenomenon occurs. As is apparent from this example, a torch attitude (in general, robot attitude), defined by the work angle $\theta$ and travel angle $\Phi$, is an important factor which determines the quality of the operation such as a welding operation or sealing operation.

Thus a torch attitude to be defined by a work angle and a travel angle must be taught accurately. For this reason, in an actual position teaching operation, a careful operation must be performed to adjust the work angle and the travel angle at each teaching point. As described above, when the X-axis direction of the tool coordinate system is made to coincide with a welding line direction (direction of the path A-B in FIG. 2), the work angle can be adjusted by a jog operation around the X axis and adjustment of the travel angle, by the jog operation around Y-axis.

In practice, however, it is often difficult to make the X-axis direction of the tool coordinate system coincide with the welding line direction by the positional relationship between a work having various shapes and the robot. In order to overcome such difficulty, there is a method in which, in place of the X-axis direction, the Y-axis direction is made to coincide with the welding line direction, the work angle is adjusted by a jog operation around the Y axis, while the travel angle is adjusted by a jog operation around the X axis. In this case, it is necessary to depress a jog key which is different from one to be depressed in a normal case wherein an attitude is adjusted when the X-axis direction and the welding line direction are made to coincide with each other.

Furthermore, according to circumstances, there may be a case where it is difficult for both the X-axis direction and Y-axis direction to be made to coincide with the welding direction. In such a, case, the jog operation around the X-axis direction and the jog operation around the Y-axis direction need to be combined to adjust the work angle and the travel angle. Such adjustment procedure, however, not only requires a high-degree of skill but also requires an extremely long time for teaching operation.

As described in the foregoing taking an example of a welding robot, the jog operation based on a conventional tool coordinate system is carried out according to a coordinate system corresponding to the attitude of a wrist of the robot, so that it is effective in teaching a path position of a robot which has a wrist to which a tool (a welding torch, a sealing gun, a spot gun, a hand, or the like) is attached. In particular, as described in the foregoing taking an example of the welding torch, the conventional jog operation method provides an effective means when an attitude of a tool relative to a work has to be correctly taught.

However, in some cases, it may be difficult to shift to an adjusting operation of a work angle so as to teach an attitude, while making one specific axis (X axis) of the tool coordinate system to coincide with the direction of a welding line (in general, an operation line; for example, a sealing line in the case of a sealing robot). More specifically, in case where the work angle and the travel angle need to be adjusted with an axis (Y axis) other than the above-specified axis (X axis) made to coincide with the direction of the operation line, this gives rise to a problem such that a jog operation different from conventional one is required. Furthermore, when it is difficult for both the X and Y axes to be made to coincide with the direction of the operation line, a more cumbersome jog operation is required.

SUMMARY OF THE INVENTION

It is an object of the present invention to provide a jog operation method conforming to a jog coordinate system always capable of making the direction of an operation line such as a welding line coincide with the direction of one specific coordinate axis throughout the teaching of the attitude at each teaching point, thereby simplifying and improving efficiency of a teaching operation to a welding robot, a sealing robot, or the like.

In order to achieve the above object, according to the present invention, there is provided a jog operation method for a robot for causing the robot to execute log movement by using manual input means connected to a robot controller, comprising the steps of: calculating data representing the direction of a first coordinate axis which coincides with a movement path direction and data representing the direction of a second coordinate axis which is vertical to both the first coordinate axis and a coordinate axis corresponding to an axial direction of a tool, based on the positional data for the movement along the path, for the robot whose tool coordinate system has been set, and storing these calculated data; and receiving an output from said manual input means to cause said robot to perform one of rotational jog movement around the first coordinate axis, translational jog feeding movement in the first coordinate axis direction, rotational jog movement around the second coordinate axis, and translational jog movement in the second coordinate axis direction.

According to the present invention, it is possible to perform a jog operation confirming to a coordinate system having the coordinate axis which coincides with the path direction and the coordinate axis which is vertical to the path direction and the axial center of the tool, so that a tool attitude such as a work angle or a travel angle can be adjusted easily by selecting a coordinate axis and operating a jog key provided on an operation panel.

BRIEF DESCRIPTION OF DRAWINGS

FIG. 4A is a view showing the second example of the key arrangement of a jog operation section used in this embodiment;

FIGS. 6A and 6B are a flow chart describing the outline of processing to be performed in this embodiment.

BEST MODE FOR CARRYING OUT THE INVENTION

The present invention is characterized in that a new coordinate system, i.e., a "path-tool coordinate system" is set for each straight path. The coordinate system will be described below with reference to FIG. 5.

Figure 5:
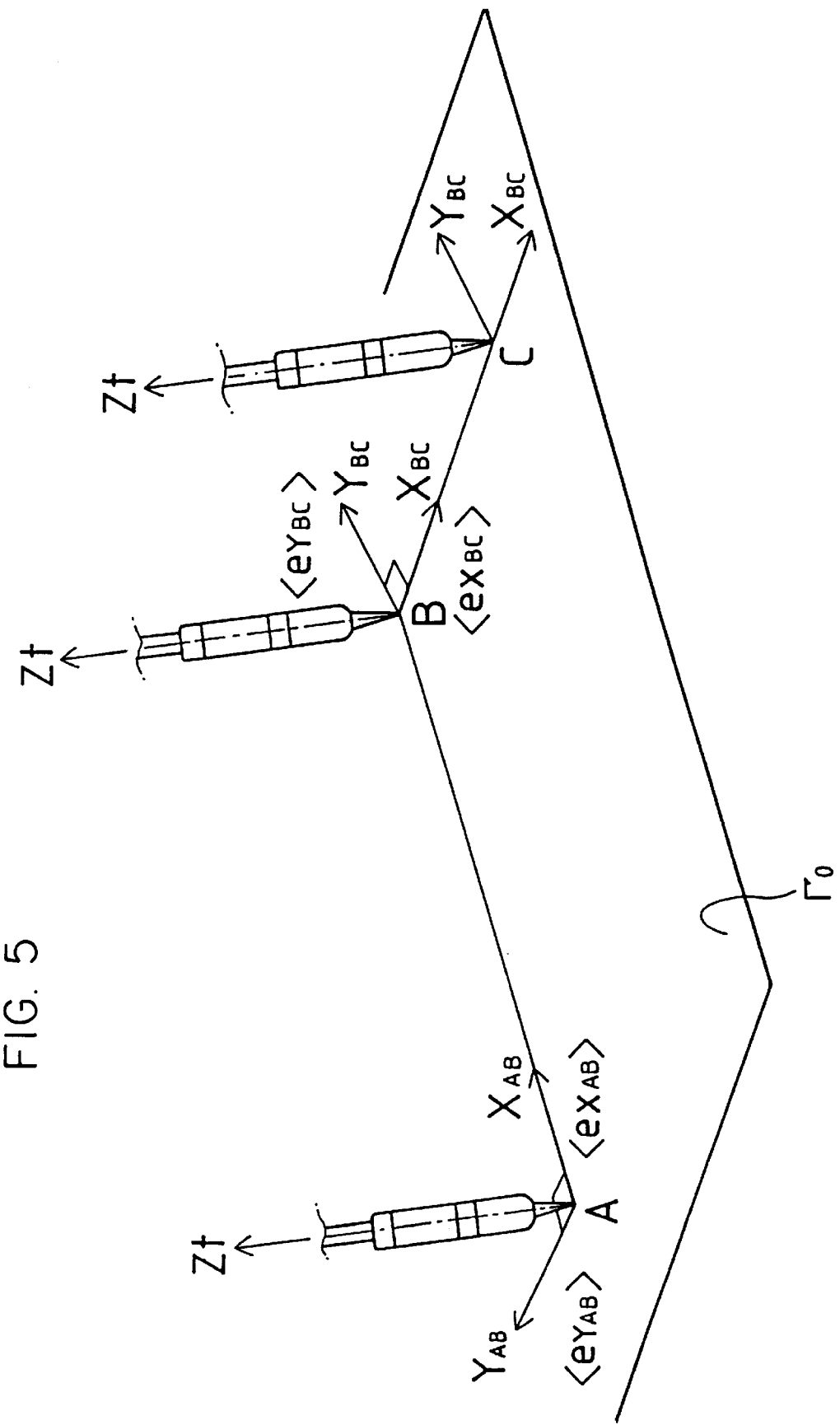
FIG. 5 is a view for explaining a welding path and a path-tool coordinate system on which a jog operation according to this embodiment is based.

With respect to a path A-B, the X axis of the path-tool coordinate system coincides with the path A-B, the Y axis is vertical to the X axis and also vertical to the axis of a tool placed at a start point A of the path; and the Z axis coincides with the axis (Z axis of the tool coordinate system) of the tool. Referring to FIG. 5, in the path-tool coordinate system for the path A-B, the X axis, Y axis, and Z axis are represented by XAB, YAB, and Zt, respectively. Similarly, with respect to a path B-C, the X axis of the path-tool coordinate system coincides with the path B-C; the Y axis is in a direction which is vertical to the X axis and vertical to the axis of a tool placed at a start point B of the path; and the Z axis coincides with the axis (Z axis of the tool coordinate system) of the tool. Referring to FIG. 5, the path-tool coordinate system for the path B-C, the X axis, Y axis, and Z axis are represented by XBC, YBC, and Zt, respectively.

As a typical embodiment of the present invention relating to a jog operation method of a robot using the path-tool coordinate system, a jog operation in a teaching operation for a welding robot which performs arc welding will be described below.

Figure 1:
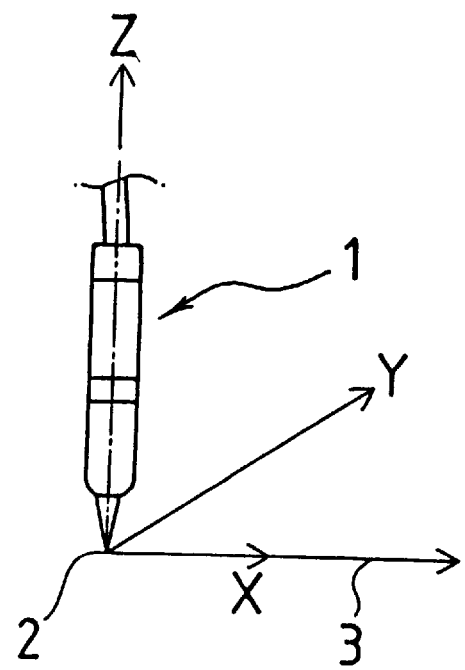
FIG. 1 is a view for explaining the relationship between the direction of a tool coordinate system and the direction of a welding path of an arc welding robot.
Figure 2:
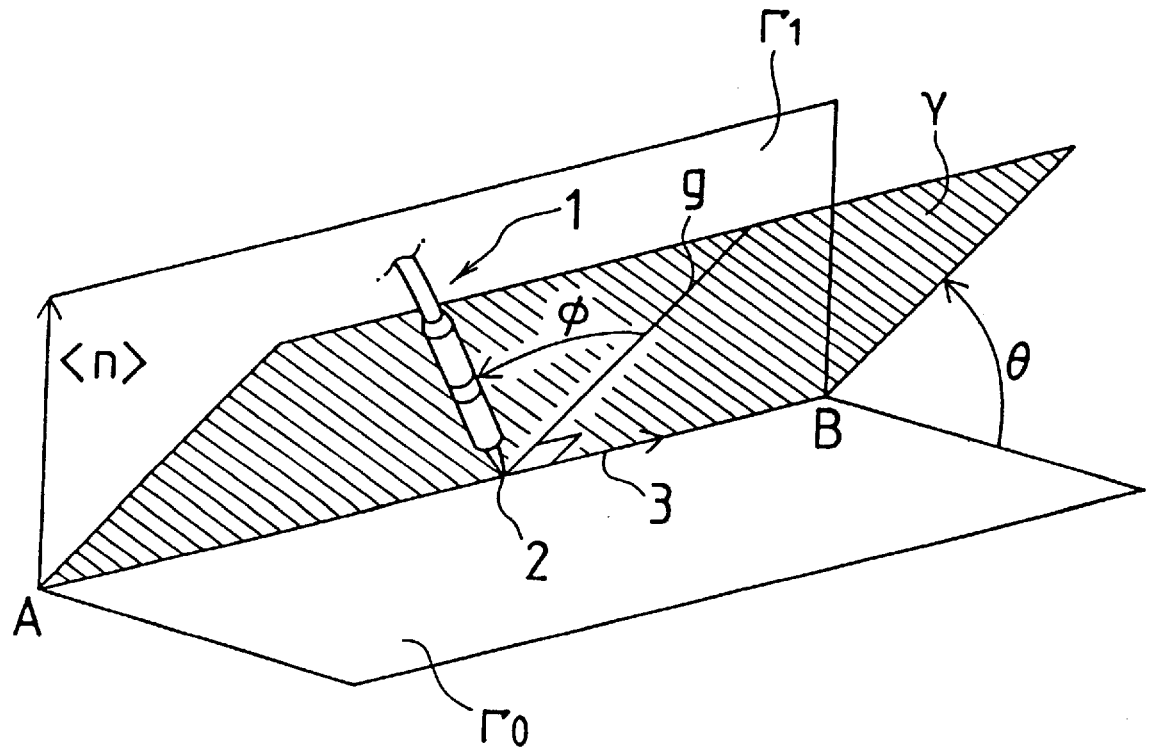
FIG. 2 is a view for explaining a work angle and a travel angle of an arc welding robot.
Figure 3:
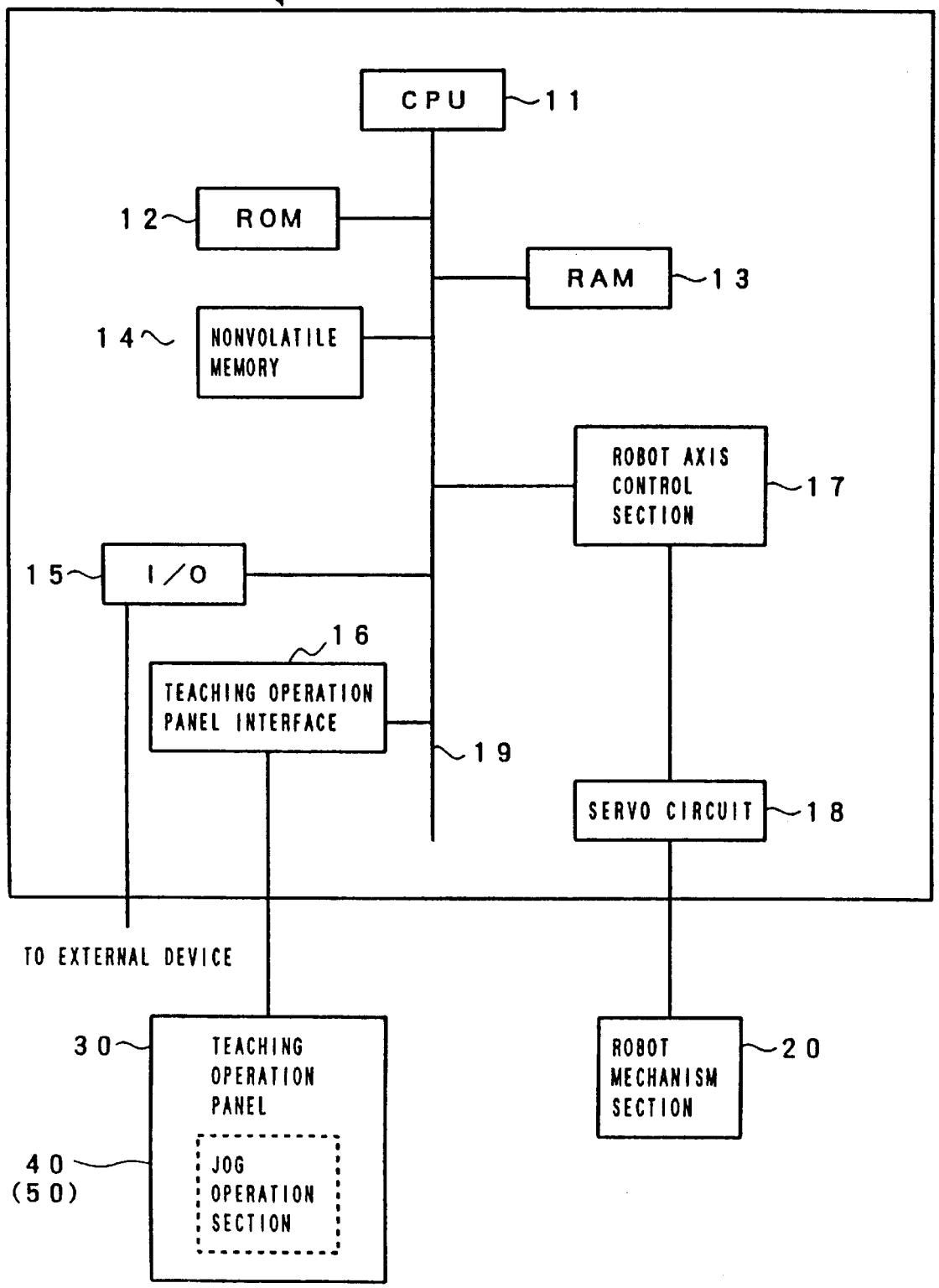
FIG. 3 is a main block diagram showing a robot controller to be used when carrying out the present invention.

Here, a robot controller which can be used in carrying out the present invention will be described below with reference to the main block diagram in FIG. 3.

A robot controller 10 has a central processing unit 11 (hereinafter referred to as a CPU). Connected to the CPU 11 through a bus 19 are memory 12 constituted of a ROM, a memory 13 constituted of a RAM, a nonvolatile memory 14, an input/output device 15 serving as an interface between the CPU 11 and an external device including a power source (not shown) of a welding torch, an interface 16 for a teaching operation panel 30, and a robot axis control section 17 which controls the operation of each axis of a robot mechanism section 20 through a servo circuit 18.

A program for controlling the entire system including the robot controller 10 itself is stored in the ROM 12. The RAM 13 is used to temporarily store the data for processing to be performed by the CPU 11. The nonvolatile memory 14 stores not only operation program data of the robot and various set values relating to the operations of the various sections of the system, but also a program relating to setting of a jog coordinate system (to be described later) and jog feeding based thereon and other various data.

The teaching operation panel 30 connected to the interface 16 has a jog operation section 40 which can output a command to the robot controller 10 by a manual input. The jog operation section 40 has a jog operation function using a conventional scheme and another function for making the CPU 11 execute a processing (to be described later) to output a command for a jog operation conforming to a path-tool coordinate system.

The key arrangement and key functions of the jog operation section 40 employed in this embodiment will be described below with reference to FIG. 4A.

A coordinate system key 41 is for selecting a conformable coordinate system for a jog operation. The coordinate system key 41 can select not only a conformable coordinate system, (three-dimensional orthogonal coordinate system such as a base coordinate system, a user coordinate system, or a tool coordinate system) in a jog operation using a conventional scheme, but also a "path-tool coordinate system".

Keys 42, 43, and 44 are jog keys which are used for both jog operation using a conventional scheme and jog operation according to the present invention, and output commands for jog movement relating to the X axis, Y axis, and Z axis of the coordinate system selected by the coordinate system key 41, respectively. Shift keys 46 to 49 are keys each of which is to be pressed together with one of the keys 42, 43, and 44 to shift a function mode.

These keys are used substantially in the following methods. In each of these methods, when simultaneous pressing of the keys is interrupted, the robot is stopped, maintaining the state of that moment; when the simultaneous depression is restarted, jog movement is started again.

A. When a normal three-dimensional orthogonal coordinate system is selected by the coordinate system key 41:

a) When one of the keys 42, 43, and 44 and one shift key 46 are simultaneously pressed, a command of rotational jog movement around the X axis, Y axis, or Z axis (minus direction) of the selected coordinate system is outputted. For example, in a state wherein a tool coordinate system is selected by the coordinate system key 41, when the key 42 and the shift key 46 are simultaneously pressed, a command of rotational jog movement around the X axis (minus direction) of the tool coordinate system is outputted.

b) When one of the keys 42, 43, and 44 and one shift key 47 are simultaneously pressed, a command of rotational jog movement around the X axis, Y axis, or Z axis (plus direction) of the selected coordinate system is outputted. For example, in a state wherein a base coordinate system is selected by the coordinate system key 41, when the key 43 and the shift key 47 are simultaneously pressed, a command of rotational jog movement around the Y axis (plus direction) of the base coordinate system is outputted.

c) When one of the keys 42, 43, and 44 and one shift key 48 are simultaneously pressed, a command of translational jog feeding movement in the +X-axis, +Y-axis, or +Z-axis direction of the selected coordinate system is outputted. For example, in a state wherein a tool coordinate system is selected by the coordinate system key 41, when the key 44 and the shift key 48 are simultaneously pressed, a command of translational jog feeding movement in the +Z-axis direction of the tool coordinate system is outputted.

d) When one of the keys 42 to 44 and one shift key 49 are simultaneously pressed, a command of translational jog feeding movement in the −X-axis, −Y-axis, or −Z-axis direction of the selected coordinate system is outputted. For example, in a state wherein a user coordinate system is selected by the coordinate system key 41, when the key 42 and the shift key 49 are simultaneously pressed, a command of translational jog feeding movement in the −Y-axis direction of the user coordinate system is outputted.

The above key operation methods are basically the same as those of a conventional scheme. The jog operation according to the present invention is performed on the basis of the following key operation method after the "path-tool coordinate system" is selected by the coordinate system key 41, B. When the "path-tool coordinate system" is selected by the coordinate system key 41:

a) When the key 42 and the shift key 46 are simultaneously pressed, a command of rotational jog movement around the X axis (minus direction) of the path-tool coordinate system is outputted. Similarly, when the key 42 and the shift key 47 are simultaneously pressed, a command of rotational jog movement around the X axis (plus direction) of the path-tool coordinate system is outputted. As will be described later, by depressing the key 42 and one of the shift keys 46 and 47 simultaneously, a work angle can be adjusted.

b) When the key 42 and the shift key 48 are simultaneously pressed, a command of translational jog feeding operation in the +X-axis direction of the path-tool coordinate system is outputted. Similarly, when the key 42 and the shift key 49 are simultaneously pressed, a command of translational jog feeding movement in the −X-axis direction of the path-tool coordinate system is outputted.

c) When the key 43 and the shift key 46 are simultaneously pressed, a command of rotational jog movement around the Y axis (minus direction) of the path-tool coordinate system is outputted. Similarly, when the key 43 and the shift key 47 are simultaneously pressed, a command of rotational jog movement around the Y axis (plus direction) of the path-tool coordinate system is outputted. As will be described later, by depressing the key 43 and one of the shift keys 46 and 47 simultaneously, a travel angle can be adjusted.

d) When the key 43 and the shift key 48 are simultaneously pressed, a command of translational jog feeding operation in the +Y-axis direction of the path-tool coordinate system is outputted. Similarly, when the key 43 and the shift key 49 are simultaneously pressed, a command of translational jog feeding movement in the −Y-axis direction of the path-tool coordinate system is outputted.

e) When the key 44 and the shift key 46 are simultaneously pressed, a command of rotational jog movement around the Z axis (minus direction) of the path-tool coordinate system is outputted. Similarly, when the key 44 and the shift key 47 are simultaneously pressed, a command of rotational jog movement around the Z axis (plus direction) of the path-tool coordinate system is outputted.

f) When the key 44 and the shift key 48 are simultaneously pressed, a command of translational jog feeding operation in the +Z-axis direction of the path-tool coordinate system is outputted. Similarly, when the key 44 and the shift key 49 are simultaneously pressed, a command of translational jog feeding movement in the −Z-axis direction of the path-tool coordinate system is outputted.

More specifically, even when the "path-tool coordinate system" is selected by the coordinate system key 41, the jog key 44 related to the Z axis maintains the same function as that available when the "tool coordinate system" is selected.

Figure 6B:
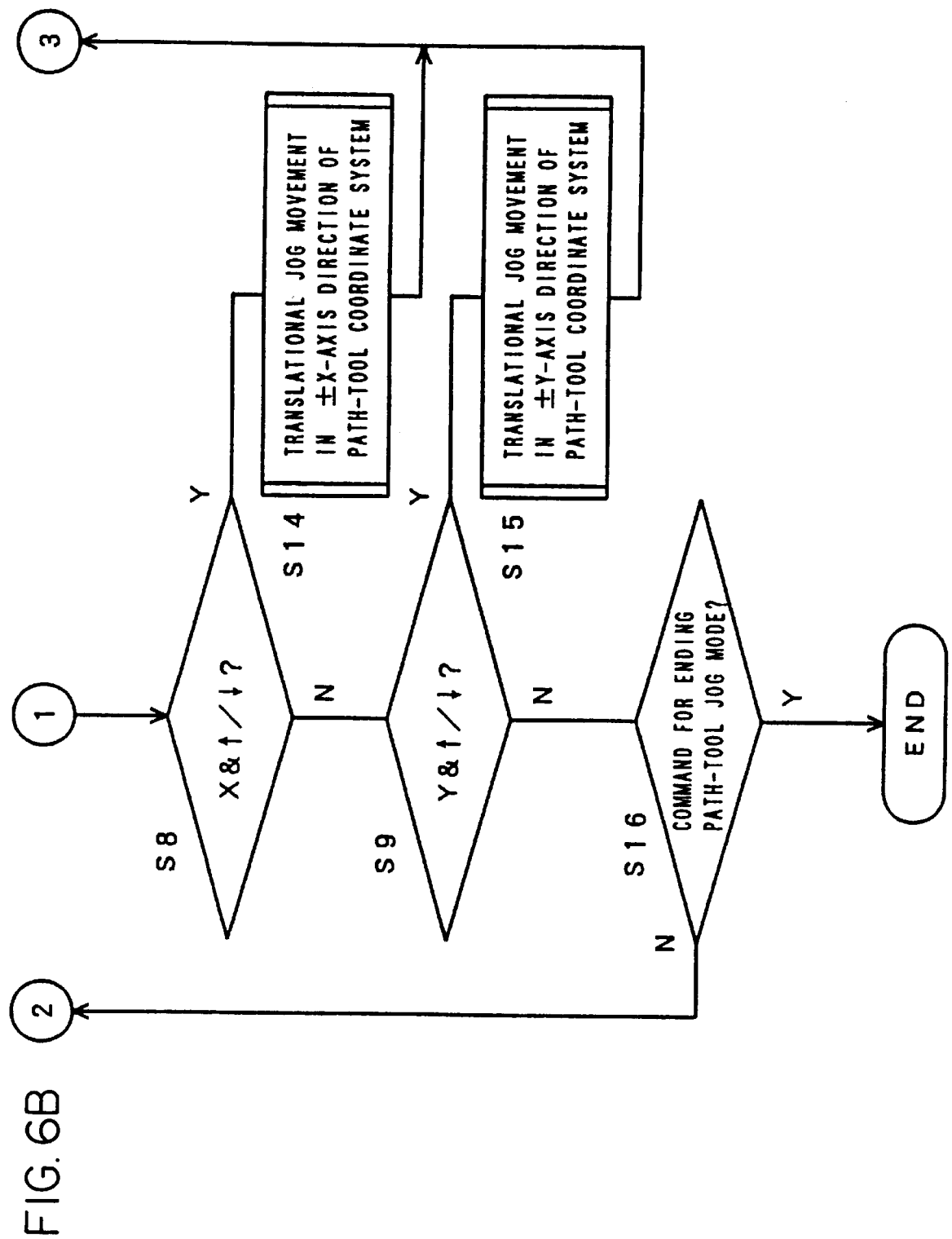

Based on the system arrangement and function described in the foregoing, and assuming a teaching operation with respect to a welding line having the path shown in FIG. 5, a key operation to be performed by an operator and the outline of processing to be executed by the CPU 11 will be described below with reference to the flow chart shown in FIGS. 6A and 6B. In this case, it is also assumed that normal coordinate systems (a base coordinate system, a user coordinate system, and the like) including a tool coordinate system have already been set by a known method.

1. First, a normal coordinate system (a tool coordinate system, a base coordinate system, or a user coordinate system) is properly selected through the coordinate system key 41, and then the keys 42, 43, and 44 and the shift keys 48 and 49 are operated so as to move a robot by a jog operation so that a tool center point (a tip of a torch) reaches a position A, the start point of path A-B.

2. Then, a teaching key (not shown) of the teaching operation panel 30 is operated to teach the position A to the robot. Since the attitude can be adjusted later, it is sufficient for the robot to be taught an approximate attitude.

3. Similarly, the robot is fed by a jog operation until the tool canter point reaches a position B, the start point of the next path B-C, and the position is taught to the robot. For the attitude, as in the case of using the position A, it is sufficient for the robot to be taught an approximate attitude.

4. (When another path is connected to the path B-C), similarly, the robot is fed by a jog operation until the tool center point reaches position C, and the position C is taught to the robot. For the attitude, as in the cases of using the positions A and B, it is sufficient for the robot to be taught an approximate attitude.

Through the above Steps 2 to 4, position data for the movement on the path is calculated without requiring a high accuracy in a tool attitude and stored in a robot controller. Further, necessary operations such as registration of the name of an operation program by which the path A-B-C is traced are performed. Here, the name of the operation program is registered as PR1.

5. A mode selection key (not shown) of the teaching operation panel 30 is operated to set a step movement mode, and the program PR1 registered in the above Step 4 is specified. In this state, the robot is moved with step motion to the position A.

Since these processings performed up to this stage are the same as those in the prior art, the descriptions thereof will be omitted here.

6. A "path-tool coordinate system" is selected by the coordinate system key 41. The resulting output is received by the CPU 11 (step S1) to calculate a parameter for defining the path-tool coordinate system. At this stage, unit vectors <eXAB> and <eYAB> representing the directions of the X axis (XAB) and the Y axis (YAB) with respect to the path A-B, and unit vectors <eXBC> and <eYBC> representing the directions of the X axis (XBC) and the Y axis (YBC) with respect to the path B-C are calculated. The result of the calculation is stored in the nonvolatile memory 14 (step S2). It must be noticed, however, that the Y axes (YA3 and YBC) to be calculated for each zone need not always be placed on a reference plane Γ0 (work surface).

The unit vector <eXAB> is calculated from the position data of the positions A and B, and the unit vector <eXBC> is calculated from the position data of the positions B and C.

Furthermore, the unit vector <eYAB> is calculated as a unit vector which is vertical to the unit vector <eYBC> and vertical to the axial direction of the tool at the position A, and the unit vector <eYBC> is calculated as a unit vector which is vertical to the unit vector <eXBC> and the axial direction of the tool. For the axial direction of the tool, the Z axis (indicated by Zt in FIG. 5) of a tool coordinate system is directly used as the Z axis of the "path-tool coordinate system". As described above, in the "path-tool coordinate system", when the robot (tool center point) is at the position A, an X axis coincides with the path A-B, a Z axis coincides with the Z axis of the tool coordinate system, and a Y axis is vertical to both the X and Y axes. More specifically, the unit vector in the Y-axis direction is an outer product of the unit vector in the X-axis direction and the unit vector in the Z-axis direction. Since the X axis is not vertical to the Z axis, it must be noticed that the "path-tool coordinate system" is not an orthogonal three-axis coordinate system.

7. By going through the above Steps, it becomes possible to perform a jog operation based on a path-tool coordinate system, and so a work angle and a travel angle with respect to the position A can be adjusted by the following key operation. When necessary, directional adjustment (direction of a torch surface) around the torch axis and positional adjustment (approach to the work surface/adjustment of departure and adjustment of wire stick out length) along the torch axis direction are performed.

7-1. Adjustment of Work angle

Work angle is adjusted by jog movement performed by a simultaneously depressing the key 42 and the shift key 46 or 47. In order to increase the work angle, the key 42 and the shift key 46 are simultaneously pressed. In order to decrease the work angle, the key 42 and the shift key 47 are simultaneously pressed.

More specifically, when the key 42 and the shift key 46 or 47 are simultaneously pressed, the flow of processing shifts from a command waiting state (step S3) to step S10 through step S4 to perform a process for rotational jog movement around the X axis (around the axis XAB with respect to the position A) of the path-tool coordinate system. Since a calculating process for jog movement around a known straight line (coordinate axis) is well known because it is a process of a conventional jog operation, description thereof will be omitted here (the same applies hereinafter).

7-2. Adjustment of Travel angle

Travel angle is adjusted by a jog movement performed by simultaneously pressing the key 43 and the shift key 46 or 47. In order to increase the travel angle, the key 43 and the shift key 47 are simultaneously pressed. In order to decrease the travel angle, the key 43 and the shift key 46 are simultaneously pressed.

More specifically, when the key 43 and the shift key 46 or 47 are simultaneously pressed, the flow of processing shifts from a command waiting state (step S3) to step S11 through step S4 and step S5 to perform a process for rotational jog movement around the Y axis (around the axis YAB with respect to the position A) of the path-tool coordinate system.

7-3. Directional Adjustment around Torch Axis (adjustment of direction of torch surface)

Directional adjustment around the torch axis is made by jog movement given by simultaneously pressing the key 44 and the shift key 46 or 47. The shift keys 46 and 47 are selectively used depending on the direction of rotational movement. More specifically, when the key 44 and the shift key 46 or 47 are simultaneously pressed, the flow of processing shifts from a command waiting state (step S3) to step S12 through step S4, step S5, and step S6 to execute a process for rotational jog movement around the Z axis (represented by Zt) of the tool coordinate system.

7-4. Positional Adjustment along Torch Axis Direction

Positional adjustment along a torch axis direction is made by jog movement given by simultaneously pressing the key 44 and the shift key 48 or 49. The shift keys 48 and 49 are selectively used depending on the direction (approach/ departure) of translational movement. More specifically, when the key 44, and the shift key 46 or 47 are simultaneously pressed, the flow of processing shifts from a command waiting state (step S3) to step S13 through step S4, step S5, step S6, and step S7 to execute a process for translational jog movement along the Z axis (represented by Zt) of the tool coordinate system.

7-5. Translational Jog Movement in X-axis Direction

Translational movement in the X-axis direction of the path-tool coordinate system is performed by jog movement given by simultaneously pressing the key 42 and the shift key 48 or 49. When the key 42 and the shift key 48 or 49 are simultaneously pressed, the flow of processing shifts from a command waiting state (step S3) to step S14 through step S4 through step S8 to execute a process for translational jog movement in the X-axis direction.

7-6. Translational Jog Movement in Y-axis Direction

Translational movement in the Y-axis direction of the path-tool coordinate system is performed by jog movement given by simultaneously pressing the key 43 and the shift key 48 or 49. When the key 43 and the shift key 48 or 49 are simultaneously pressed, the flow of processing shifts from a command waiting state (step S3) to step S15 through step S4 to step S9 to perform a process for translational jog movement in the Y-axis direction.

8. Upon completion of adjustment relating to the position A as described above, a teaching key (not shown) is pressed. As a result, the positional data of a position (naturally including that of a tool attitude) of a robot (tool center point) at that point is formed and stored in the nonvolatile memory 14 (this process is omitted in the flow chart).

9. When a start key (not shown) is pressed after a step movement mode is brought about again, the flow of processing departs from the cycle of steps S3 to S15 and shifts to step S17 through step S16 to move the robot to the position B (maintaining the path-tool jog mode) with step motion. If another coordinate system (for example, tool coordinate system) is selected by operating the coordinate system key 41 without setting a step movement mode, a command for ending the path-tool jog mode is outputted, and the process of the path-tool jog mode is ended once.

10. When the robot reaches the position B, a command waiting state in step S3 is set. From this step on, the positional teaching relating to the position B is performed according to the procedures similar to those in the above Steps 7 to 9. The position B can be regarded as belonging to the zone AB and the zone BC. FIG. 5 shows a case wherein the position B is regarded as a point belonging to the zone BC, the direction of the X axis of the path-tool coordinate system is set in the direction of the path B-C (direction of the unit vector <eXBC>, and the direction of the Y axis is set in the direction (direction of the unit vector <eYBC>) vertical to the direction of the path B-C. In this case, for example, when the key 42 and the shift key 46 or 47 are simultaneously pressed, a process for rotational jog movement around the XBC axis is executed (adjustment of a work angle for the path B-C). Similarly, when the key 43 and the shift key 48 or 49 are simultaneously pressed, a process for rotational jog movement around the YBC axis is executed (adjustment of a travel angle for the path B-C).

Similarly, upon completion of adjustment and teaching of position with respect to the position B, the robot is moved to the position C, and adjustment with respect to the position C and positional teaching are performed. Since the position C is the end point, the position C is regarded as a point belonging to the path B-C. Therefore, the function of each key in a path-tool jog operation is the same as the function in the case of adjustment with respect to the position B.

Figure 4B:
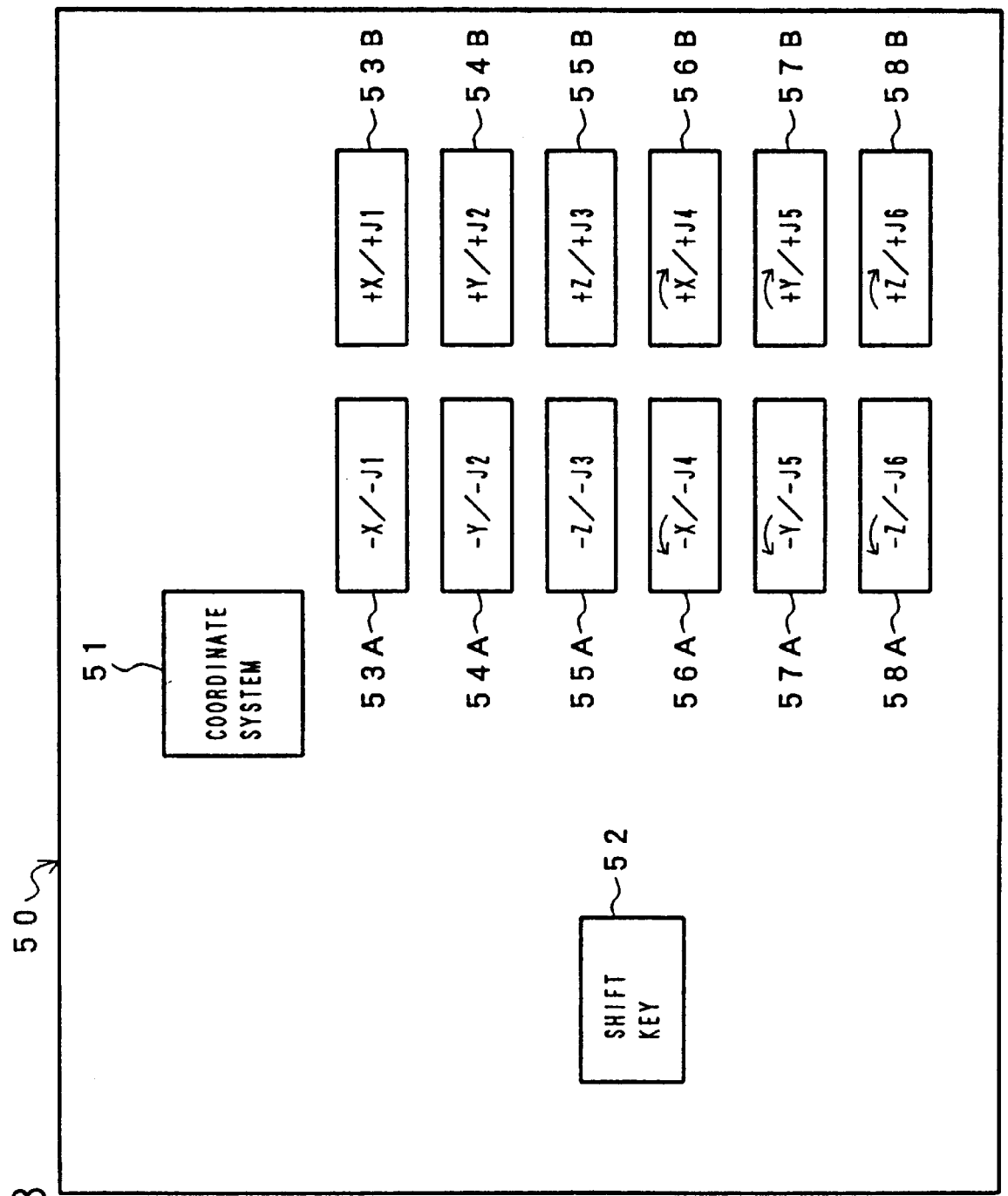
FIG. 4B is a view showing the first example of the key arrangement.

Upon completion of positional teaching with respect to the position C, when any other coordinate system is selected by operating the coordinate system key 41 to a command for ending the path-tool jog mode (YES in step S12) is outputted, and the processing in the path-tool jog mode is ended. The key operation and the procedure of processing have been described above with reference to the case wherein the key arrangement shown in FIG. 4 is employed. However, various key arrangements other than the above key arrangement can be employed. One of the various key arrangements is shown in FIG. 4B as an example. The arrangement and functions of the keys shown in FIG. 4B are as follows.

A coordinate system key 51 is for selecting a coordinate system to be conformed to in a jog operation The coordinate system key 51 can select not only a coordinate system to be conformed to in a jog operation according to a conventional way (a three-dimensional orthogonal coordinate system such as a base coordinate system, a user coordinate system, or a tool coordinate system and individual-axis coordinate system), but also a path-tool coordinate system.

Keys 53A; 53B, 54A: 54B, . . . , 58A: 58B are jog keys which can be used in a jog operation according to a conventional way and a jog operation according to the present invention. These keys output commands for jog movement relating to the X axis, Y axis, and Z axis of the coordinate system selected by the coordinate system key 51 and axes (J1 to J6). A shift key 52, when depressed simultaneously with one of the jog keys 53A to 58B, causes the function mode to shift. The outline of the actual procedure is as follows. As in the case of key arrangement shown in FIG. 4A, when the simultaneous depression of keys required for jog movement is interrupted, the robot is stopped in that state. However, when simultaneous pressing is resumed, jog movement is started again.

A. When a normal three-dimensional orthogonal coordinate system is selected by the coordinate system key 51;

a) When one of the jog keys 53A, 53B, 54A, 54B, 55A, and 55B and the shift key 52 are simultaneously pressed, a command for translational movement along the ±X axis, ±Y axis, and ±Z axis of the selected coordinate axis is outputted. For example, when the jog key 53A and the shift key 52 are simultaneously pressed while a tool coordinate system is selected by the coordinate system key 51, a command for translational jog movement along the –X-axis direction of the tool, coordinate system is outputted, and, when the jog key 54B and the shift key 52 are simultaneously pressed, a command for translational jog movement along the +Y-axis direction of the tool coordinate system is outputted.

b) When one of the jog keys 56A, 56B, 57A, 57B, 58A, and 58B and the shift key 52 are simultaneously pressed, a command for rotational jog movement around the X axis, Y axis, or Z axis (± direction) of the selected coordinate system is outputted. For example, when the jog key 56A and the shift key 52 are simultaneously pressed while a user coordinate system is selected by the coordinate system key 51, a command for rotational jog movement around the X axis (minus direction) of the user coordinate system is outputted, and, when the jog key 58A and the shift key 52 are simultaneously pressed, a command for rotational jog movement around the Z axis (plus direction) of the user coordinate system is outputted.

B. When a various-axis coordinate system is selected by the coordinate system key 51;

a) When one of the jog keys 53A, 54A, . . . , 57A, and 58A and the shift key 52 are simultaneously pressed, a command for axis feeding jog movement in a minus direction with respect to axes J1 to J6 is outputted. For example, when the jog key 56A and the shift key 52 are simultaneously pressed, a command for axial feeding jog movement of the axis J1 (minus direction) is outputted. When the jog key 57B and the shift key 52 are simultaneously pressed, a command for axial feeding jog movement of the axis J5 (plus direction) is outputted.

A key operation in the cases A and B are not different basically from that in the case of a conventional scheme. When a jog operation according to the present invention is to be performed by using the key arrangement of this embodiment, a "path-tool coordinate system" is selected first, and then the keys are operated as follows: (especially, 3-2).

C. When the "path-tool coordinate system" is selected by the coordinate system key 51;

a) When one of the jog keys 53A, 53B, 54A, 54B, 55A, and 55B and the shift key 52 are simultaneously pressed, a command for translational movement along the ±X axis, ±Y axis, or ±Z axis of the path-tool coordinate system is outputted. For example, when the jog key 55A and the shift key 52 are simultaneously pressed, a command for translational jog movement along the −Z-axis direction of the path-tool coordinate system is outputted. When the jog key 55B and the shift key 52 are simultaneously pressed, translational jog movement along the +Z-axis direction of the path-tool coordinate system is outputted.

b) When one of jog keys 56A, 56B, 57A, 57B, 58A, and 58B and the shift key 52 are simultaneously pressed, a command for rotational jog movement around the X axis, Y axis, or Z axis (± direction) of the path-tool coordinate system is outputted. For example, when the jog key 56A and the shift key 52 are simultaneously pressed, a command for rotational jog movement around the X axis (minus direction) of the path-tool coordinate system is outputted. When the jog key 57B and the shift key 52 are simultaneously pressed, a command for rotational jog movement around the Y axis (plus direction) of the path-tool coordinate system is outputted.

More specifically, when the jog keys 56A and 56B are selectively pressed while the shift key 52 is pressed, adjustment of the travel angle can be made. In order to adjust the work angle, an operation in which the shift key 52 and one of the jog keys 57A and 57B are simultaneously pressed, is used.

When a key operation according to the above operation method is executed with the key arrangement shown in FIG. 4B, it is apparent that the same processing as that described by the example using the key arrangement shown in FIG. 4A can be performed by the CPU 11.

Although the embodiment of the present invention is described taking an arc welding robot as an example, it is apparent that the embodiment will be essentially the same if the application is changed to another type, except that the tool is switched to another type (for example, the change for a sealing gun, a spot gun, or hand).

As has been described above, according to the present invention, it always becomes possible to perform a jog operation conforming to a coordinate system having a coordinate axis which coincides with a path direction and a coordinate axis which is vertical to the above coordinate axis and vertical to the axis of the tool Therefore, the tool attitude such as a work angle and a travel angle can be directly adjusted. When the present invention is applied to a teaching operation which requires precise tool attitude, the efficiency and reliability of the teaching operation can be improved markedly. In particular, when the present invention is applied to an arc welding robot, an appropriate work angle and an appropriate travel angle can be taught quickly, so that welding bead failure caused by undercutting, overlapping, lack of penetration, or the like can be prevented easily.

We claim:

1. A jog operation method for a robot for causing the robot to execute jog movement by using manual input means connected to a robot controller, comprising the steps of:

(a) calculating data representing the direction of a first coordinate axis which coincides with a movement path direction and data representing the direction of a second coordinate axis which is vertical to both the first coordinate axis and a coordinate axis corresponding to an axial direction of a tool, based on the positional data for the movement along the path, for the robot whose tool coordinate system has been set, and storing these calculated data; and (b) receiving an output from said manual input means to cause said robot to perform one of rotational jog movement around the first coordinate axis, translational jog feeding movement in the first coordinate axis direction, rotational jog movement around the second coordinate axis, and translational jog movement in the second coordinate axis direction.

2. A jog operation method of a robot according to claim 1, further comprising the step of, after the step (b) is performed, causing said robot to perform translational jog movement in a direction along a coordinate axis corresponding to the axial direction of the tool among the coordinate axes of the tool coordinate system.

3. A jog operation method of a robot according to claim 1, further comprising the step of, after the step (b) is performed, causing said robot to perform rotational jog movement around the axis of the tool corresponding to one of the coordinate axes of the tool coordinate system.

4. A jog operation method of a robot according to claim 1, wherein the step (b) is executed for the robot which is moved to a position designated by the position data.

5. A jog operation method of a robot according to claim 1, wherein the position data for the movement along the path is formed in said robot controller by preliminary position teaching not requiring accuracy in tool attitude.

6. A jog operation method of a robot according to claim 1, wherein said robot is an arc welding robot, the work angle is adjusted by rotational jog movement around the first coordinate axis, and the travel angle is adjusted by rotational jog movement around the second coordinate axis.

7. A jog operation system of a robot, comprising:

coordinate system selection means capable of selecting one of a plurality of coordinate systems including a tool coordinate system stored in a robot controller;

jog movement command output: means comprising a plurality of keys which output a command for causing a tool supported by said robot to perform rotational movement or translational movement around or along the coordinate axis corresponding to the selected key in the coordinate system selected by said coordinate system selection means;

position teaching means for teaching a tool center point to the robot, when the tool center point is moved to one point on a path by an output from said jog movement command output means; and means for setting and storing in the robot controller a coordinate system having coordinate axes including a first axis which coincides with the direction of the path and a second axis which is vertical to the first axis and vertical to an axis of said tool with its end point located at one point on said path.

8. A jog operation system of a robot according to claim 7, wherein the coordinate system set and stored in said robot controller is a non-orthogonal three-axis coordinate system having two coordinate axes corresponding to the first and second axes and a third coordinate axis corresponding to the axis of said tool.

\* \* \* \* \*

UNITED STATES PATENT AND TRADEMARK OFFICE
CERTIFICATE OF CORRECTION

PATENT NO.:    5,911,892
DATED     :    June 15, 1999
INVENTOR(S):   T. KOSAKA, et al.

It is certified that error appears in the above-identified patent and that said Letters Patent is hereby corrected as shown below:

Title Page,    item 75,      replace "Oshino-mura" with --Minamitsuru--;

Col. 2,    line 5,      replace "Is" with --is--;
Col. 3,    line 43,      replace "log" with --jog--;
Col. 6,    line 15,      replace "," with --.--;
Col. 8,    line 29,      after "by" (first occurrence) insert --a--;
                                               after "by" (second occurrence) delete "a";
Col. 10,    line 25,      after "operation" insert --.--;
Col. 12,    line 63,      delete ":".

Signed and Sealed this

Fourth Day of January, 2000

Attest:

Attesting Officer          *Acting Commissioner of Patents and Trademarks*